United States Patent Office.

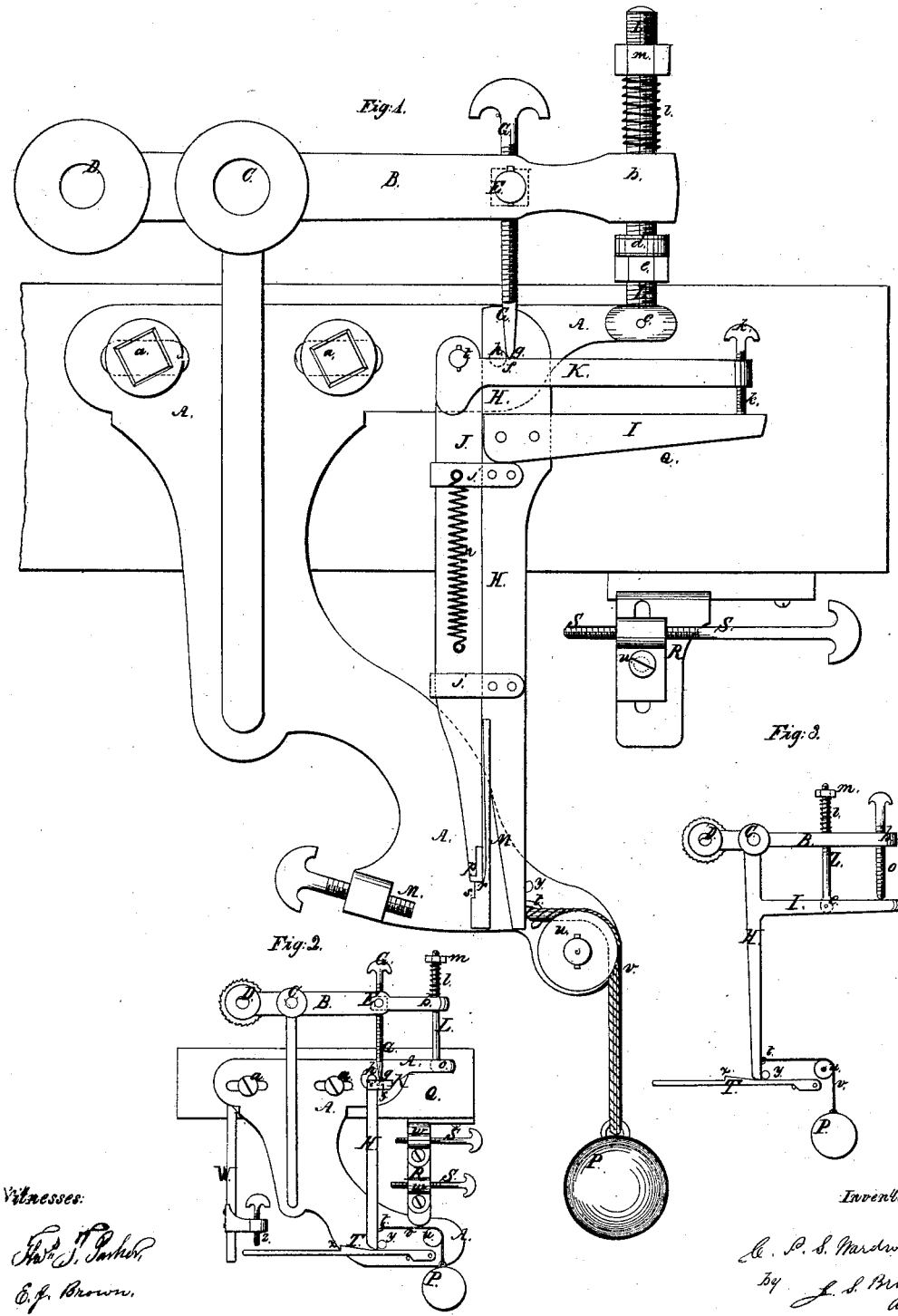

C. P. S. WARDWELL, OF LAKE VILLAGE, NEW HAMPSHIRE.

Letters Patent No. 69,281, dated September 24, 1867.

IMPROVEMENT IN MACHINERY FOR MAKING NEEDLES.

The Schedule referred to in these Letters Patent and making part of the same.

TO ALL WHOM IT MAY CONCERN:

Be it known that I, C. P. S. WARDWELL, of Lake Village, in the county of Belknap, and State of New Hampshire, have invented an Improvement in Machines for Making Machine-Knitting Needles; and I do hereby declare that the following is a full and exact description thereof, reference being had to the accompanying drawings, making part of this specification—

Figure 1 being a side elevation of that part of a machine for making machine-knitting needles which embodies my improvement.

Figure 2, a view, on a smaller scale, of a modification of my improvement.

Figure 3, a view, on a reduced scale, of another modification of my improvement.

Like letters designate corresponding parts in all of the figures.

My improvement is directly applicable to the machine for making machine-knitting needles, for which my application for Letters Patent is now pending before the Patent Office. It is not necessary, therefore, for me to represent or describe any of the parts of the general machine, except those to which my improvement immediately relates.

The improvement consists in a device for letting the burr-cutters (by which the needles are slabbed) out of action as soon as the slabbing is completed, and again bringing the cutters down into position for action to slab the succeeding needles.

I employ the same swinging-frame B as described in said Letters Patent. It swings or vibrates up and down around a fixed pivot, C, which projects from a flanch portion, A, of the frame of the machine, said flanch piece being attached and adjusted to the frame by set-screws $a$ $a$. D represents the arbor of the burr-cutters, mounted in one end of the swinging-frame, and at the other end of the frame is arranged the device for controlling the movements of the frame as desired. Near the end $b$ of the swinging-frame a guide-bolt, L, projects upward through said frame, its lower end being pivoted or otherwise suitably secured at $c$ to the flanch A of the main frame. On this guide-bolt L, above the swinging-frame, is a coiled spring, $l$, which keeps that end of the frame pressed downward with a force regulated by a nut, $m$, screwed down on the bolt. Below the swinging-frame there is on the bolt an elastic stop, $d$, which limits the extent to which that end of the swinging-frame can descend, and is adjustable up and down by a nut, $e$. The end $b$ of the swinging-frame is held upward in position to bring the cutters at the other end down into position for action by a set-screw, G, resting on a bar, K, which is itself mounted on a right-angled or knee-shaped lever, H I, the arm H thereof projecting downward, and the arm I projecting horizontally, or nearly so. This lever is pivoted at $h$, a little nearer the fulcrum pivot C of the swinging-frame than the notch or point $f$, where the lower end or point $g$ of the set-screw G rests on the bar K. The said set-screw passes through a pivot-block, E, which turns in the swinging-frame, and allows the set-screw to move or turn sidewise to any extent. The set-screw is turned to adjust the height of that end of the swinging-frame, and consequently the depth to which the cutters slab the needles. A set-screw, $k$, in the outer end of the bar K, also adjusts the height of the said bar above the arm I of the right-angled lever. This lever is the means by which the movements of the swinging-frame or bar are controlled. By the side of its vertical arm H is a sliding bar, J, held in position by bands $j$ $j$, or their equivalent, and jointed at its upper end to the bar K. Its lower end is sustained by a projection or shoulder, $r$, on the side of a spring, N, which is attached to the lever arm H. The said arm is held in a vertical position by a weight, P, drawing a cord, $v$, around a pulley, $u$, upon a hook or staple, $t$, of the lever, or an equivalent device, the lever arm thus being held bearing against a stop, $y$, on the flanch A of the main frame.

As shown in the drawings, the parts are in position for holding the cutters down in place for slabbing. As soon as the slabbing has proceeded far enough, a screw-stop, S, on a projection, R, of the reciprocating table Q of the machine, strikes the lever arm H, and pushes it along till the spring N strikes an adjustable stop, M, on the frame flanch A. This bends the spring N back, and disengages the sliding bar J from the shoulder R thereon, thus allowing the said bar, and consequently the supporting bar K, and the end $b$ of the swinging-frame B, to drop far enough to raise the cutters away from contact with the advancing needles. Then, as the reciprocating bed recedes, the lever arm H is again brought back into vertical position by the weight P, and as the vertically-sliding head described in my other Letters Patent descends, it depresses the cutter end of the swinging-frame, and consequently raises the other end $b$, and a spring, $n$, lifts the sliding bar J, which is again sustained by the shoulder $r$ on the spring N. Thus all parts are brought back to their former position, and remain thus till the next forward movement of the reciprocating table repeats the operation of letting the cutters out of action. The stop S is not only adjustable forward and backward, so as to regulate the time of action, but also up and down, by a set-screw, $u$, on the projection R, so as to vary the extent of its action.

In the modification, fig. 2, the same principle is applied, and the parts are the same, except the elastic-stop on the guide-bolt L, the supporting and drooping slide bars K and J, sustaining spring N, and stop M. Instead of these parts, the lever H, by its swing motion, sufficiently depresses the set-screw G, and consequently the end $b$ of the swinging-frame B, to raise the cutters out of action. The lower end of the lever then catches behind a notch, $x$, on a spring, T, and is thus held, till at the proper time a set-screw or stop, $z$, on a projection, W, of the vertically-sliding bar of the machine, strikes the spring T, and depresses it sufficiently to release the lever H, which is immediately drawn back into vertical position by the weight P, and all parts are in position as before. By this device, not only are the cutters thrown out of action, but the form of the barb may be determined thereby, instead of by means of an inclined bed, as described in my other Letters Patent. For this purpose, all that is necessary is to have a second set-screw or stop, S, on the projection R, below the set-screw S, so arranged as to strike the lever H first, and, by being near its lower end, act more gradually on it to produce the taper form of the barb. Finally, the stop S strikes the lever, and, operating more rapidly on it, throws the cutters out of action, as before described.

In the other modification, fig. 3, the whole mechanism is simplified, though its action is not so perfect and efficient as by the above-described plans. The right-angled lever H I pivots on the same fulcrum C as the swinging-frame B, and turns therewith, but its horizontal arm I is adjusted in relation to the end $b$ of the swinging-frame by a set-screw, O, so as to adjust the position of the cutters. The guide-bolt or rod L, pivoted to the arm I, is situated between the adjusting-screw O and the fulcrum pivot C. A spring, $l$, adjusted by a nut, $m$, keeps the swinging-frame pressed upon the arm I of the lever. The lever is operated and held in the same manner as described in the modification, fig. 2. As in this case, the lever H swings with the swinging-frame, the cutter end of which may be considered as the short arm and the arm H the long arm of one lever, it is evident that the motion of the arm H may raise and lower the cutters, as described.

What I claim as my invention, and desire to secure by Letters Patent, is—

The mechanism herein described, arranged and operating substantially as set forth, for the purpose of raising the cutters out of action, and returning and retaining them in action, successively, as herein specified.

The above specification of my improved machine for making machine-knitting needles and other needles signed by me this 25th day of January, 1867.

C. P. S. WARDWELL.

Witnesses:
JOHN ALDRICH,
JOHN B. HENDLEY.